United States Patent
Samuel et al.

(10) Patent No.: US 11,347,664 B1
(45) Date of Patent: May 31, 2022

(54) SHARED TRANSIENT MEMORY STORAGE IN BASIC INPUT/OUTPUT SYSTEM ENVIRONMENT

(71) Applicant: Dell Products L.P., Round Rock, TX (US)

(72) Inventors: Balasingh P. Samuel, Round Rock, TX (US); Michael W. Arms, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/168,635

(22) Filed: Feb. 5, 2021

(51) Int. Cl.
*G06F 13/16* (2006.01)
*G06F 3/06* (2006.01)

(52) U.S. Cl.
CPC .......... *G06F 13/1668* (2013.01); *G06F 3/061* (2013.01); *G06F 3/068* (2013.01); *G06F 3/0659* (2013.01)

(58) Field of Classification Search
CPC ......... G06F 8/654; G06F 9/445; G06F 15/177
See application file for complete search history.

(56) References Cited

U.S. PATENT DOCUMENTS

| | | | |
|---|---|---|---|
| 2004/0088534 A1* | 5/2004 | Smith | G06F 8/65 713/1 |
| 2012/0208619 A1* | 8/2012 | Canterbury | G06F 21/575 463/25 |
| 2017/0147329 A1* | 5/2017 | Shutt | G06F 8/654 |
| 2018/0165100 A1* | 6/2018 | Natu | G06F 11/106 |
| 2018/0188959 A1* | 7/2018 | Thakkar | G11C 29/023 |

* cited by examiner

*Primary Examiner* — Getente A Yimer
(74) *Attorney, Agent, or Firm* — Jackson Walker L.L.P.

(57) ABSTRACT

A method may be provided in a basic input/output system embodied in persistent memory including two data areas for storing data associated with the basic input/output system and a code area comprising firmware for performing functionality of the basic input/output system. The method may include, at any given time, designating one of the data areas as a non-transitory data area and designating the other of the data areas as a transitory data area; and for each item of data associated with the basic input/output system, determining if such item of data is non-transitory-type data or transitory-type data, storing such item of data in the non-transitory data area if such item of data is determined to be non-transitory-type data, and storing such item of data in the transitory data area if such item of data is determined to be transitory-type data.

20 Claims, 3 Drawing Sheets

SHARED TRANSIENT MEMORY STORAGE IN BASIC INPUT/OUTPUT SYSTEM ENVIRONMENT

TECHNICAL FIELD

The present disclosure relates in general to information handling systems, and more specifically to add shared transient memory to store Unified Extensible Firmware Interface (UEFI) variable and other platform data in a basic input/output system environment of an information handling system, for example, to expand non-volatile random access memory (NVRAM) (or flash) memory utilization without requiring larger NVRAM memory.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Flash memory (e.g., typically coupled to a processor via a Serial Peripheral Interface) in an information handling system is often used to store basic input/output system firmware code and variables. Over time, the capacity need for flash memory may increase due to the complexity of newer technologies, additional firmware features, and storing system configuration and diagnostics data. A larger flash memory may increase size, cost, and complexity of an information handling system.

Preboot applications have limited availability of code and data for temporary storage, for example, code and data such as multi-language font packages, device firmware packages, and live hardware data collection.

Accordingly, systems and methods that address these disadvantages of traditional approaches are desired.

SUMMARY

In accordance with the teachings of the present disclosure, the disadvantages and problems associated with storage of code and data in a basic input/output system environment of an information handling system may be reduced or eliminated.

In accordance with embodiments of the present disclosure, an information handling system may include a processor, a basic input/output system embodied in persistent memory, communicatively coupled to the processor, and comprising: two data areas for storing data associated with the basic input/output system and a code area comprising firmware for performing functionality of the basic input/output system, including a transient memory manager. The transient memory manager may be configured to, when read and executed by the processor: at any given time, designate one of the data areas as a non-transitory data area and designate the other of the data areas as a transitory data area; and for each item of data associated with the basic input/output system, determine if such item of data is non-transitory-type data or transitory-type data; store such item of data in the non-transitory data area if such item of data is determined to be non-transitory-type data; and store such item of data in the transitory data area if such item of data is determined to be transitory-type data.

In accordance with embodiments of the present disclosure, a method may be provided in a basic input/output system embodied in persistent memory including two data areas for storing data associated with the basic input/output system and a code area comprising firmware for performing functionality of the basic input/output system. The method may include, at any given time, designating one of the data areas as a non-transitory data area and designating the other of the data areas as a transitory data area; and for each item of data associated with the basic input/output system, determining if such item of data is non-transitory-type data or transitory-type data, storing such item of data in the non-transitory data area if such item of data is determined to be non-transitory-type data, and storing such item of data in the transitory data area if such item of data is determined to be transitory-type data.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
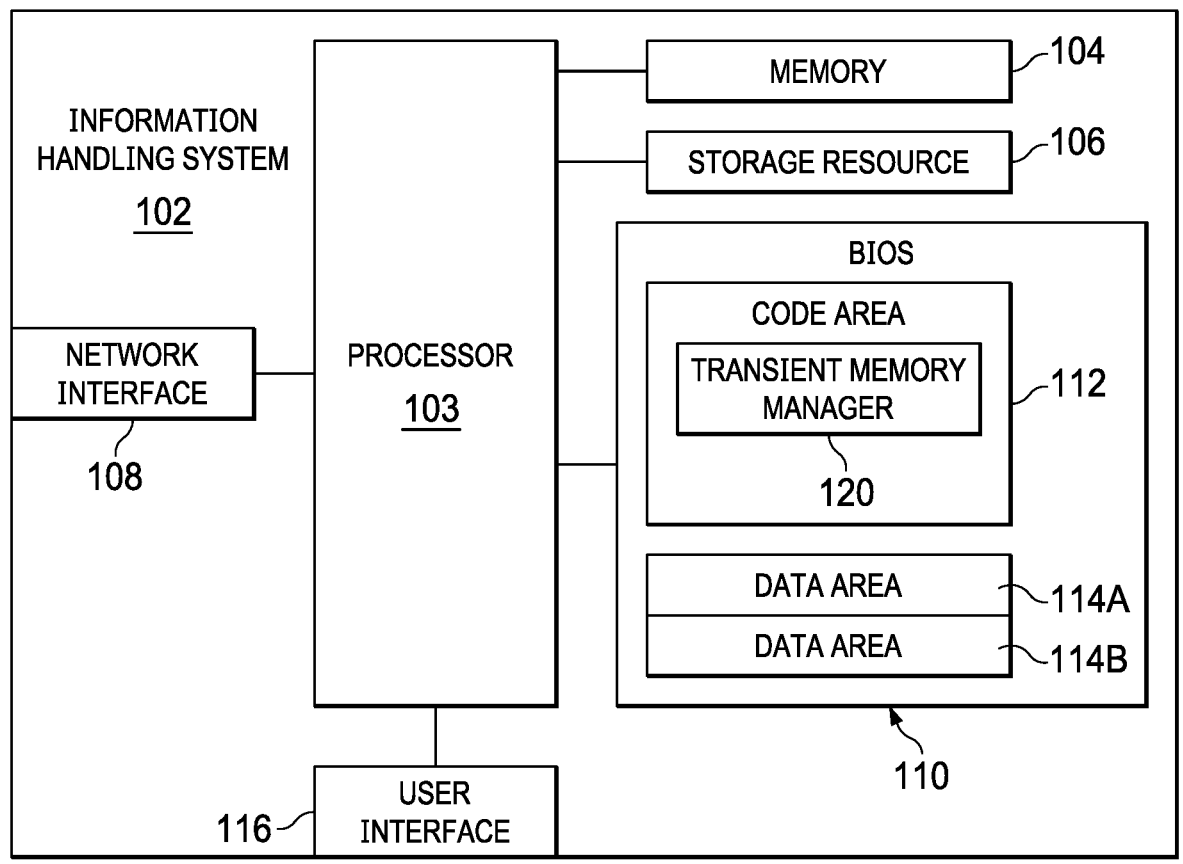
FIG. 1 illustrates a block diagram of an example information handling system, in accordance with embodiments of the present disclosure.
Figure 2:
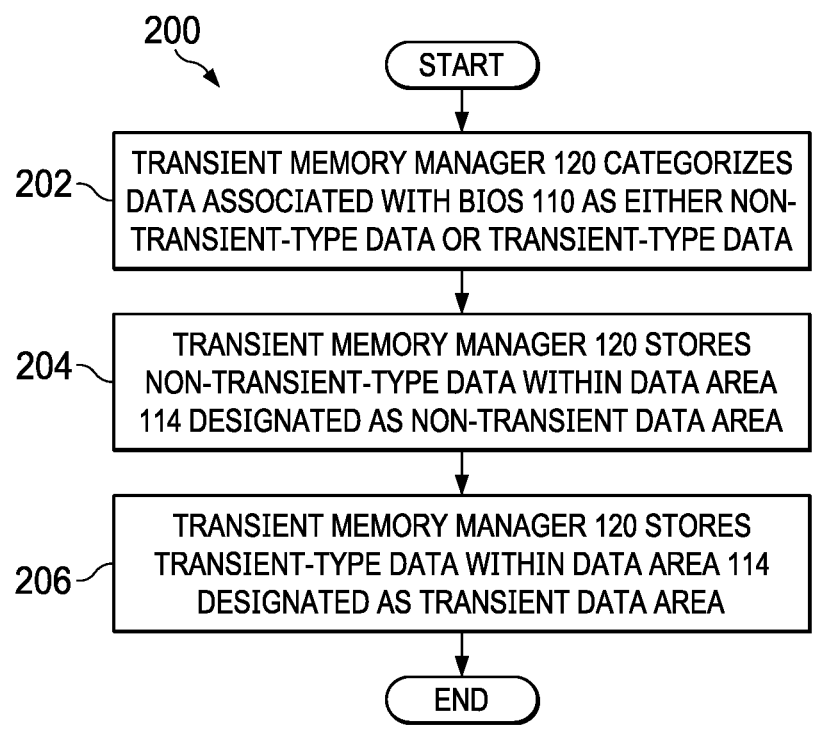
FIG. 2 illustrates a flow chart of an example method for using transient data storage in a persistent memory of a BIOS to improve utilization of the persistent memory, in accordance with embodiments of the present disclosure.
Figure 3:
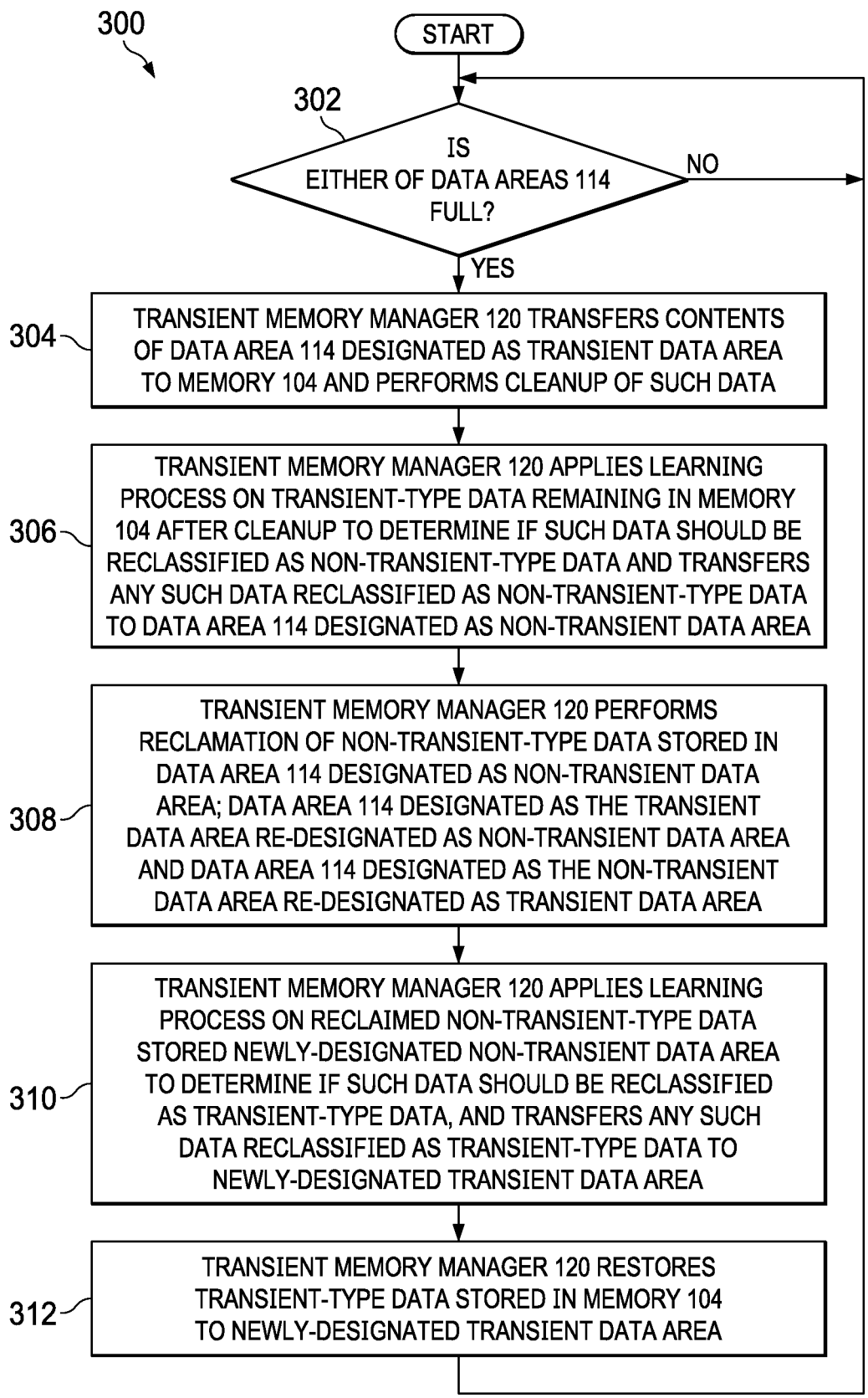
FIG. 3 illustrates a flow chart of an example method for data reclamation using a transient memory area of persistent memory of a BIOS, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside external to a chassis or other enclosure comprising information handling system 102.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 110 may be implemented at least in part with a persistent memory (e.g., non-volatile random access memory (NVRAM) or flash memory) including a code area 112, a first data area 114A, and a second data area 114B. As described in greater detail below, at any given time, one of data areas 114 may serve as storage for non-transient (e.g., permanent) data associated with BIOS 110 and the other data area 114 may serve as storage for transient (e.g., temporary) data associated with BIOS 110.

As also shown in FIG. 1, code area 112 may include executable code for a transient memory manager 120. Transient memory manager 120 may comprise one or more programs of executable instructions configured to, when loaded and executed by processor 103, categorize data associated with BIOS 110 as either non-transient-type data or transient-type data and manage first data area 114A and second data area 114B to store data such that non-transient-type data is stored in the data area 114 designated as the non-transient data area and transient-type data is stored in the data area 114 designated as the transient data area. As also described in greater detail below, transient memory manager 120 may also be configured to manage which data area 114 is designated as the non-transient data area and which data area 114 is designated as the transient data area, and to periodically perform reclamation of the non-transient data area.

In some embodiments, transient memory manager 120 may be implemented while in part using industry-standard UEFI variable services, or may be configured to closely couple with such variable services in carrying out its functionality.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

FIG. 2 illustrates a flow chart of an example method 200 for using transient data storage in a persistent memory of a BIOS to improve utilization of the persistent memory, in accordance with embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, transient memory manager 120 may categorize data associated with BIOS 110 as either non-transient-type data or transient-type data. In general, data which is required or needed to survive for a long duration (e.g., between boot cycles of information handling system 102) may be classified by transient memory manager 120 as non-transient-type data. Examples of non-transient-type data may include critical system configuration parameters or events or statuses that may need to be logged through successive boot cycles. On the other hand, transient memory manager 120 may classify data which is required or needed to survive for shorter durations (e.g., only the current boot cycle of information handling system 102) as transient-type data. Examples of transient-type data may include telemetry data, firmware packages temporarily staged for future updates or dynamic bug fixes. Transient memory manager 120 may categorize data as non-transient-type or transient-type on any suitable basis. For example, in some embodiments, transient memory manager 120 may categorize data as non-transient-type or transient-type based learned behavior and statistics regarding usage of data.

At step 204, transient memory manager 120 may store non-transient-type data within the data area 114 designated as the non-transient data area.

At step 206, transient memory manager 120 may store transient-type data within the data area 114 designated as the transient data area. In some embodiments, transient memory manager 120 may dynamically size the transient data area (e.g., based on a policy of information handling system 102). The transient data area may be a portion of the persistent memory of BIOS 110 typically used as backup storage for performing reclamation of data stored in the data area 114 being used as the non-transient data area. However, in accordance with systems and methods of the present disclosure, instead of being largely unused (except as used for data reclamation), such data area 114 may be used as the transient data area to store less-critical information, potentially maximizing space in the data area 114 designated as the non-transient data area to store more critical information, without requiring an increase in overall persistent memory to store such data.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

FIG. 3 illustrates a flow chart of an example method 300 for data reclamation using a transient memory area of persistent memory of a BIOS, in accordance with embodiments of the present disclosure. According to one embodiment, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, transient memory manager 120 may determine if either of data areas 114 are full. If either of data areas 114 are full, method 300 may proceed to step 304. Otherwise, method 300 may remain at step 302 until either of data areas 114 are full.

At step 304, transient memory manager 120 may transfer the contents of the data area 114 designated as the transient data area to memory 104, and perform cleanup of such data in accordance with any suitable approach (e.g., to delete any stale data). In some embodiments, in connection with transferring contents of the data area designated as the transient data area to memory 104, transient memory manager 120 may also archive telemetry data (e.g., to an Extended Firmware Interface System Partition).

At step 306, transient memory manager 120 may apply a learning process on the transient-type data remaining in memory 104 after cleanup to determine if such data should be reclassified as non-transient-type data, and may transfer any such data reclassified as non-transient-type data to the data area 114 designated as the non-transient data area.

At step 308, transient memory manager 120 may perform reclamation of non-transient-type data stored in the data area 114 designated as the non-transient data area. As a result of the reclamation process, such data may be transferred to the data area 114 designated as the transient data area, and thus, the data area 114 designated as the transient data area may be re-designated as the non-transient data area, and the data area 114 designated as the non-transient data area may be re-designated as the transient data area.

At step 310, transient memory manager 120 may apply a learning process on the reclaimed non-transitory-type data stored in data area 114 newly-designated as the non-transient data area, to determine if such data should be reclassified as transient-type data, and may transfer any such data reclassified as transient-type data to the data area 114 newly-designated as the transient data area.

At step 312, transient memory manager 120 may restore the transient-type data stored in memory 104 (i.e., at steps 304 and 306 above) to the data area 114 newly-designated as the transient data area.

After completion of step 312, method 300 may proceed again to step 302.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a basic input/output system embodied in persistent memory, communicatively coupled to the processor, and comprising:
   two data areas for storing data associated with the basic input/output system; and
   a code area comprising firmware for performing functionality of the basic input/output system, including a transient memory manager configured to, when read and executed by the processor:
   at any given time, designate one of the data areas as a non-transitory data area and designate the other of the data areas as a transitory data area; and
   for each item of data associated with the basic input/output system:
   determine if such item of data is non-transitory-type data or transitory-type data;
   store such item of data in the non-transitory data area if such item of data is determined to be non-transitory-type data; and
   store such item of data in the transitory data area if such item of data is determined to be transitory-type data.

2. The information handling system of claim 1, wherein non-transitory-type data is data required by the basic input/output system to survive across multiple boot cycles of the information handling system.

3. The information handling system of claim 1, wherein transitory-type data is data not required by the basic input/output system to survive across multiple boot cycles of the information handling system.

4. The information handling system of claim 1, wherein the transient memory manager is configured to, responsive to either of the two data areas being full, perform a reclamation process on the two data areas.

5. The information handling system of claim 4, wherein the reclamation process comprises:
   transferring contents of the transient data area to a memory external to the basic input/output system;
   performing reclamation of non-transient-type data in the non-transitory data area, including:
      re-designating the transient data area as the non-transitory data area and storing the non-transient-type data into such newly-designated non-transitory data area; and
      re-designating the non-transient data area as the transitory data; and
   restoring the transient-type data from the memory to such newly-designated non-transitory data area.

6. The information handling system of claim 5, wherein the reclamation process comprises performing cleanup on the transient-type data prior to storing the transient-type data to memory.

7. The information handling system of claim 5, wherein the reclamation process comprises performing cleanup on the non-transient-type data prior to storing the non-transient-type data to the newly-designated non-transitory data area.

8. The information handling system of claim 5, wherein the reclamation process comprises:
   determining if any of the transient-type data stored to the memory should be re-classified as non-transient-type data;
   re-classifying any such transient-type data as non-transient-type data; and
   storing such re-classified non-transient-type data to the non-transitory data area.

9. The information handling system of claim 5, wherein the reclamation process comprises:
   determining if any of the non-transient-type data stored to the newly-designated non-transitory data area memory should be re-classified as transient-type data;
   re-classifying any such non-transient-type data as transient-type data; and
   storing such re-classified transient-type data to the newly-designated transitory data area.

10. The information handling system of claim 5, wherein the reclamation process comprises archiving telemetry data of the transitory-type data.

11. A method comprising, in a basic input/output system embodied in persistent memory including two data areas for storing data associated with the basic input/output system and a code area comprising firmware for performing functionality of the basic input/output system:
   at any given time, designating one of the data areas as a non-transitory data area and designating the other of the data areas as a transitory data area; and
   for each item of data associated with the basic input/output system:
      determining if such item of data is non-transitory-type data or transitory-type data;
      storing such item of data in the non-transitory data area if such item of data is determined to be non-transitory-type data; and
      storing such item of data in the transitory data area if such item of data is determined to be transitory-type data.

12. The method of claim 11, wherein non-transitory-type data is data required by the basic input/output system to survive across multiple boot cycles of the information handling system.

13. The method of claim 11, wherein transitory-type data is data not required by the basic input/output system to survive across multiple boot cycles of the information handling system.

14. The method of claim 11, further comprising, responsive to either of the two data areas being full, performing a reclamation process on the two data areas.

15. The method of claim 14, wherein the reclamation process comprises:
   transferring contents of the transient data area to a memory external to the basic input/output system;
   performing reclamation of non-transient-type data in the non-transitory data area, including:
      re-designating the transient data area as the non-transitory data area and storing the non-transient-type data into such newly-designated non-transitory data area; and
      re-designating the non-transient data area as the transitory data; and
   restoring the transient-type data from the memory to such newly-designated non-transitory data area.

16. The method of claim 15, wherein the reclamation process comprises performing cleanup on the transient-type data prior to storing the transient-type data to memory.

17. The method of claim 15, wherein the reclamation process comprises performing cleanup on the non-transient-type data prior to storing the non-transient-type data to the newly-designated non-transitory data area.

18. The method of claim 15, wherein the reclamation process comprises:
   determining if any of the transient-type data stored to the memory should be re-classified as non-transient-type data;
   re-classifying any such transient-type data as non-transient-type data; and
   storing such re-classified non-transient-type data to the non-transitory data area.

19. The method of claim 15, wherein the reclamation process comprises:
   determining if any of the non-transient-type data stored to the newly-designated non-transitory data area memory should be re-classified as transient-type data;
   re-classifying any such non-transient-type data as transient-type data; and
   storing such re-classified transient-type data to the newly-designated transitory data area.

20. The method of claim 15, wherein the reclamation process comprises archiving telemetry data of the transitory-type data.

\* \* \* \* \*